United States Patent
Chang et al.

(10) Patent No.: US 7,860,192 B2
(45) Date of Patent: Dec. 28, 2010

(54) FSK DEMODULATOR, FM DEMODULATOR, AND RELATED METHOD WITH A BUILD-IN BAND-PASS FILTER

(75) Inventors: Kwo-Wei Chang, Hsinchu County (TW); Chun-Yi Li, Taipei (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 1065 days.

(21) Appl. No.: 11/563,689

(22) Filed: Nov. 28, 2006

(65) Prior Publication Data

US 2007/0217549 A1    Sep. 20, 2007

(30) Foreign Application Priority Data

Mar. 14, 2006    (TW) ............... 95108641 A

(51) Int. Cl.
*H04L 27/06* (2006.01)
(52) U.S. Cl. .............. 375/334; 329/300; 331/179; 332/100; 340/825.58; 375/269; 375/272; 375/303; 375/323
(58) Field of Classification Search ............ None
See application file for complete search history.

(56) References Cited

U.S. PATENT DOCUMENTS

| | | | |
|---|---|---|---|
| 5,150,082 A | 9/1992 | Grimmett |
| 5,382,922 A | 1/1995 | Gersbach |
| 6,018,702 A | 1/2000 | Luiz |
| 6,134,282 A | 10/2000 | Ben-Efraim |
| 2003/0078028 A1* | 4/2003 | Shimada et al. ............. 455/339 |
| 2006/0145754 A1 | 7/2006 | Kitano |
| 2007/0229174 A1 | 10/2007 | Chang |

FOREIGN PATENT DOCUMENTS

| | | |
|---|---|---|
| JP | S50140235 | 11/1975 |
| JP | S6336643 | 2/1988 |
| JP | H01183908 | 7/1989 |
| JP | H03175714 | 7/1991 |
| JP | H10308647 | 11/1998 |
| JP | 200378392 | 3/2003 |
| JP | 2003133905 | 5/2003 |
| JP | 2005223439 | 8/2005 |
| JP | 2007251943 | 9/2007 |
| TW | 200607226 | 2/2006 |

\* cited by examiner

*Primary Examiner*—David C Payne
*Assistant Examiner*—Adolf Dsouza
(74) *Attorney, Agent, or Firm*—Winston Hsu; Scott Margo

(57) ABSTRACT

A frequency shift keying (FSK) demodulator includes a band-pass filter, an auto-calibration loop, a phase comparator, and an analog-to-digital converter. The band-pass filter is used for shifting phase of an FSK signal to generate a revised FSK signal. The auto-calibration loop is coupled to the band-pass filter for adjusting a center frequency of the band-pass filter. The first input end of the phase comparator is coupled to an output end of the band-pass filter, and the second input end of the phase comparator is used for receiving the FSK signal. The phase comparator is used for comparing the FSK signal with the revised FSK signal and outputting a comparison result. The analog-to-digital converter is coupled to the phase comparator for converting the results of the phase comparator into digital data. Similarly, a frequency modulation (FM) demodulator includes a band-pass filter, an auto-calibration loop, and a phase comparator.

16 Claims, 5 Drawing Sheets

FSK DEMODULATOR, FM DEMODULATOR, AND RELATED METHOD WITH A BUILD-IN BAND-PASS FILTER

BACKGROUND OF THE INVENTION

1. Field of the Invention

The present invention relates to a frequency shift keying (FSK) demodulator circuit and frequency modulation (FM) demodulator circuit, and more particularly, to an FSK demodulator circuit and FM demodulator circuit utilizing a band-pass filter to shift phase.

2. Description of the Prior Art

The tendency of chip integration continues to head towards more logic components and smaller areas. At present, a chip designer lessens external components for lowering cost and reducing the areas of the circuit as far as possible. Hence, an essential technology becomes integrating external components into an internal chip, such as integrating a filter into a chip.

The development of wireless communication changes with each passing day since the $19^{th}$ century discovery of electromagnetic waves. Regardless if commercial usage or other field, wireless communication is closely linked to human daily use. The audible frequency range of a human ear, from about 20 Hz to 20 kHz, is difficult to transmit by radio. Therefore, transmitters use higher frequencies to transmit wireless waves (called carrier waves) and hide information in the carrier waves. Receivers return information from the carrier waves. By modulating and demodulating signals, signals can be transmitted farther. The drawback of transmitting signals wirelessly is that there is noise interference. Hence, demodulating the original signal correctly becomes an essential technology in wireless communication.

Please refer to FIG. 1 that is a diagram of a frequency modulation (FM) demodulator circuit 10 according to the prior art. The FM demodulator circuit 10 includes a discriminator 12 and a multiplier 14. The discriminator 12 includes a resistor R, a capacitor C, and an inductor L. A first end of the resistor R is coupled to a first end of the capacitor C, a first end of the inductor L, and a first input end 142 of the multiplier 14. A second end of the resistor R is coupled to a second end of the capacitor C, a second end of the inductor L, and ground. A frequency modulated signal FM is coupled to a second input end 144 of the multiplier 14 and an input end 122 of the discriminator 12. The discriminator 12 includes a center frequency fc which equals $1/(2*pi*sqrt(L*C))$. When the frequency of the frequency modulated signal FM is exactly fc, a phase difference between the frequency modulated signal FM and a signal outputted from the discriminator 12 is exactly 90 degrees. When the frequency of the frequency modulated signal FM is fc+fsig, the phase difference between the frequency modulated signal FM and the signal outputted from the discriminator 12 is exactly (90+k*fsig) degrees. When the frequency of the frequency modulated signal FM is fc−fsig, the phase difference between the frequency modulated signal FM and the signal outputted from the discriminator 12 is exactly (90−k*fsig) degrees. Inputting the frequency modulated signal FM and the signal outputted from the discriminator 12 into the multiplier 14 and multiplying can detect whether the phase difference between the frequency modulated signal FM and the signal outputted from the discriminator 12 is greater or less than 90 degrees. This derives the value and the polarity (positive or negative) of the frequency fsig and derives the frequency of the frequency modulated signal FM (fc+fsig or fc−fsig) further. The derived frequency is utilized for returning the information of the frequency modulated signal FM, and then completing the demodulation of the frequency modulation (FM).

Please refer to FIG. 2 that is a diagram of a frequency shift keying (FSK) demodulator circuit 20 according to the prior art. The FSK demodulator circuit 20 includes a discriminator 12, a multiplier 14, and an analog-to-digital converter 26. The analog-to-digital converter 26 is coupled to the multiplier 14 for converting a result outputted from the multiplier 14 into digital data. The discriminator 12 includes a resistor R, a capacitor C, and an inductor L. A first end of the resistor R is coupled to a first end of the capacitor C, a first end of the inductor L, and a first input end 142 of the multiplier 14. A second end of the resistor R is coupled to a second end of the capacitor C, a second end of the inductor L, and ground. A frequency shift keying signal FSK is coupled to a second input end 144 of the multiplier 14 and an input end 122 of the discriminator 12. The discriminator 12 includes a center frequency fc which equals $1/(2*pi*sqrt(L*C))$. When the frequency of the frequency shift keying signal FSK is exactly fc, a phase difference between the frequency shift keying signal FSK and a signal outputted from the discriminator 12 is exactly 90 degrees. When the frequency of the frequency shift keying signal FSK is fc+fsig, the phase difference between the frequency shift keying signal FSK and the signal outputted from the discriminator 12 is exactly (90+k*fsig) degrees. When the frequency of the frequency shift keying signal FSK is fc−fsig, the phase difference between the frequency shift keying signal FSK and the signal outputted from the discriminator 12 is exactly (90−k*fsig) degrees. Inputting the frequency shift keying signal FSK and the signal outputted from the discriminator 12 into the multiplier 14 and multiplying can detect whether the phase difference between the frequency shift keying signal FSK and the signal outputted from the discriminator 12 is greater or less than 90 degrees. This derives the value and the polarity (positive or negative) of the frequency fsig and derives the frequency of the frequency shift keying signal FSK (fc+fsig or fc−fsig) further. The derived frequency is utilized for returning the information of the frequency shift keying signal FSK, and then completing the demodulation of the frequency shift keying (FSK).

Due to the center frequency fc of the discriminator 12 being equal to $1/(2*pi*sqrt(L*C))$, when the center frequency fc is very low, a large capacitance and inductance are required to reach it. A large internal capacitor and inductor are unable to be used on a chip. Therefore, an external capacitor and inductor are needed. The drawbacks of the method are that it wastes large printed circuit board (PCB) area and raises the cost.

SUMMARY OF THE INVENTION

The claimed invention provides an FSK demodulator circuit with a build-in band-pass filter. The FSK demodulator includes a band-pass filter, an auto-calibration loop, a phase comparator, and an analog-to-digital converter. The band-pass filter is used as a phase shifter of the FSK demodulator for shifting phase of an FSK signal to generate a revised FSK signal. The auto-calibration loop is coupled to the band-pass filter for adjusting a center frequency of the band-pass filter. The first input end of the phase comparator is coupled to an output end of the band-pass filter, and the second input end of the phase comparator is used for receiving the FSK signal. The phase comparator is used for comparing the FSK signal with the revised FSK signal for a phase difference and outputting a comparison result. The analog-to-digital converter is coupled to the phase comparator for converting the results of the phase comparator into digital data.

The claimed invention provides an FM demodulator circuit with a build-in band-pass filter. The FM demodulator includes a band-pass filter, an auto-calibration loop, and a phase comparator. The band-pass filter is used for shifting phase of an FSK signal to generate a revised FSK signal. The auto-calibration loop is coupled to the band-pass filter for adjusting a center frequency of the band-pass filter. The first input end of the phase comparator is coupled to an output end of the band-pass filter, and the second input end of the phase comparator is used for receiving the FSK signal. The phase comparator is used for comparing the FSK signal with the revised FSK signal for a phase difference and outputting a comparison result.

The claimed invention provides an FSK demodulating method. The FSK demodulating method includes shifting a phase of an FSK signal to generate a revised FSK signal, adjusting a center frequency for calibrating the phase shifting of the FSK signal, comparing the FSK signal with the revised FSK signal for a phase difference and outputting a comparison result, and converting the comparison result into digital data.

The claimed invention provides an FM demodulating method. The FM demodulating method includes shifting a phase of an FSK signal to generate a revised FSK signal, adjusting a center frequency for calibrating the phase shifting of the FSK signal, and comparing the FSK signal with the revised FSK signal for a phase difference and outputting a comparison result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
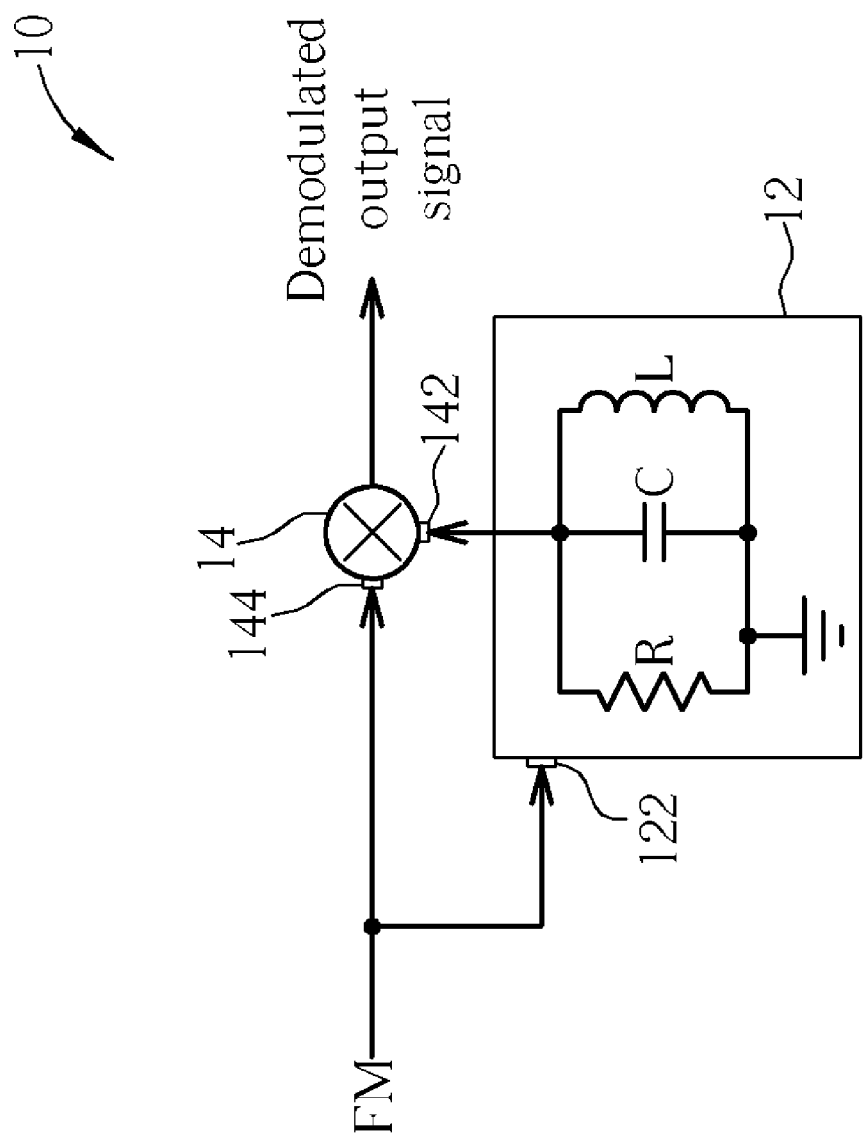
FIG. 1 is a diagram of an FM demodulator circuit according to the prior art.
Figure 2:
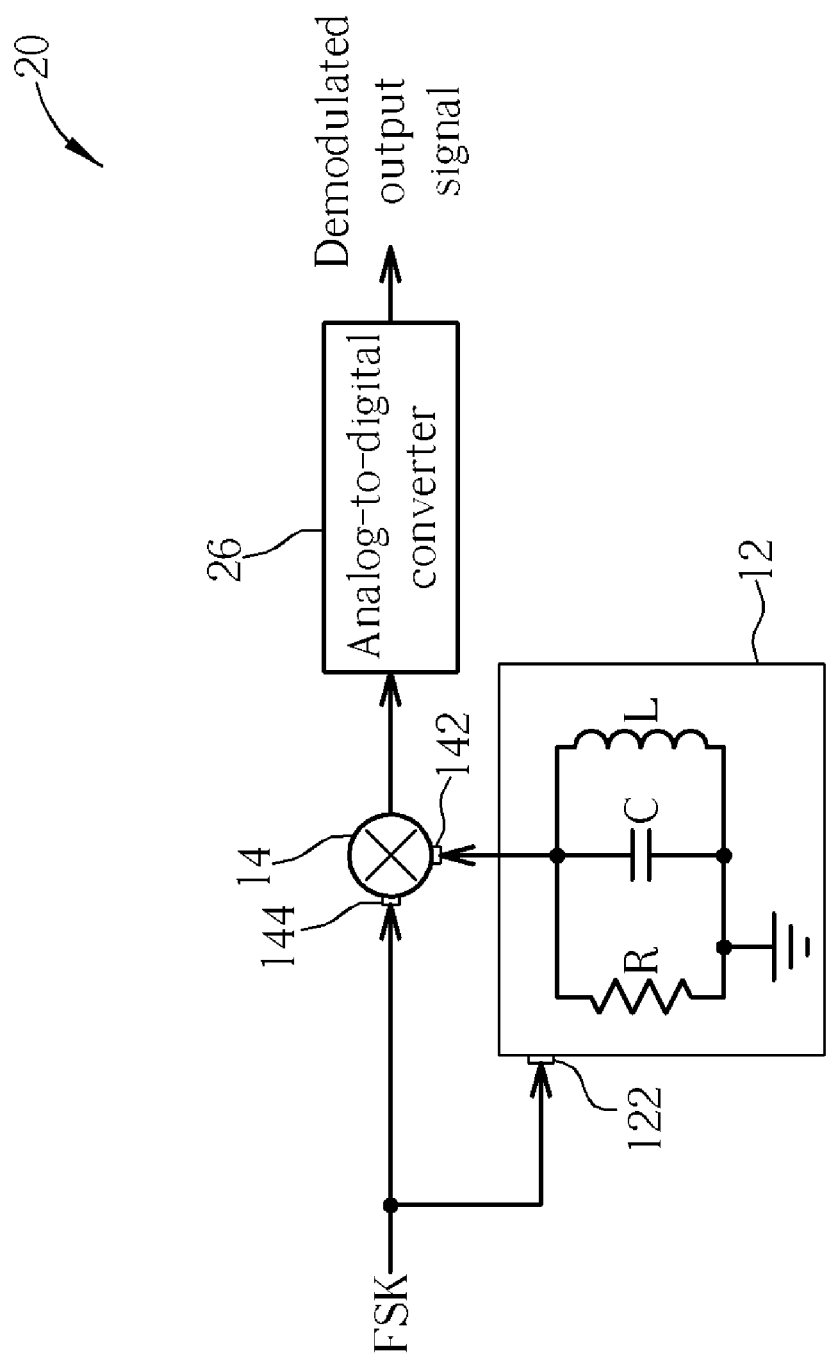
FIG. 2 is a diagram of an FSK demodulator circuit according to the prior art.
Figure 3:
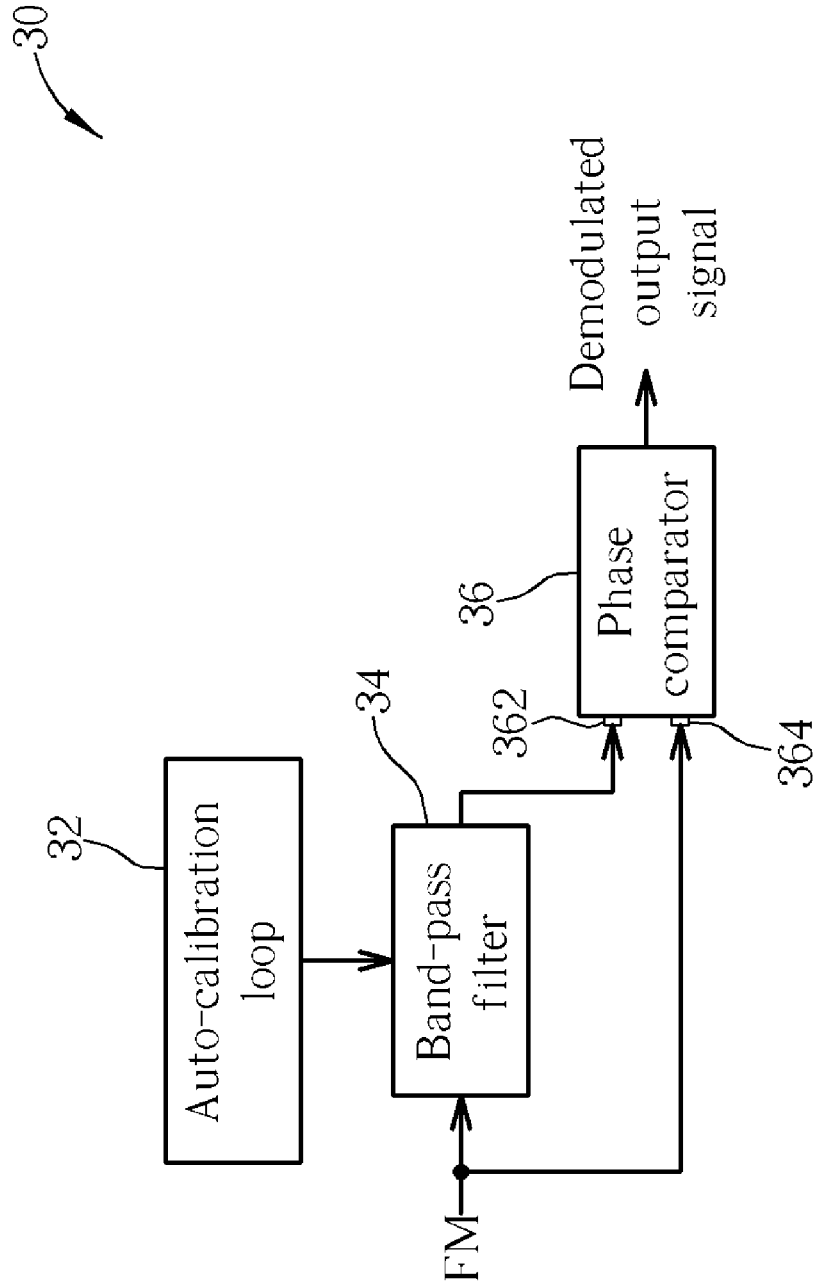
FIG. 3 is a diagram of an FM demodulator circuit according to an embodiment of the present invention.

Please refer to FIG. 3 that is a diagram of an FM demodulator circuit 30 according to an embodiment of the present invention. The FM demodulator circuit 30 includes a band-pass filter 34, an auto-calibration loop 32, and a phase comparator 36. The band-pass filter 34 is used as a phase shifter of the FM demodulator circuit 30 for shifting phase of a frequency modulated signal FM. The band-pass filter 34 includes a center frequency fc. When the frequency of the frequency modulated signal FM is exactly fc, a phase difference between the frequency modulated signal FM and a signal outputted from the band-pass filter 34 is exactly 0 degrees. When the frequency of the frequency modulated signal FM is fc+fsig, the phase difference between the frequency modulated signal FM and the signal outputted from the band-pass filter 34 is k*fsig degrees. When the frequency of the frequency modulated signal FM is fc−fsig, the phase difference between the frequency modulated signal FM and the signal outputted from the band-pass filter 34 is negative k*fsig degrees. The auto-calibration loop 32 is coupled to the band-pass filter 34 for adjusting the center frequency fc of the band-pass filter 34. The first input end 362 of the phase comparator 36 is coupled to an output end of the band-pass filter 34, and the second input end 364 of the phase comparator 36 is used for receiving the frequency modulated signal FM. The phase comparator 36 is used for comparing the frequency modulated signal FM and the signal outputted from the band-pass filter 34 for a phase difference. Detecting whether the phase difference between the frequency modulated signal FM and the signal outputted from the band-pass filter 34 is greater or less than 0 degrees can derive the value of fsig. This derives the value and the polarity (positive or negative) of the frequency fsig and derives the frequency of the frequency modulated signal FM (fc+fsig or fc−fsig) further. The derived frequency is utilized to return the information of the frequency modulated signal FM to complete the demodulation of the frequency modulation. The band-pass filter 34, the auto-calibration loop 32, and the phase comparator 36 are integrated on a same chip. The band-pass filter 34 and the auto-calibration loop 32 include the same components. For an example, the band-pass filter 34 is a transconductance-c filter, and the auto-calibration loop 32 is an integrator comprising transconductors and capacitors.

Figure 4:
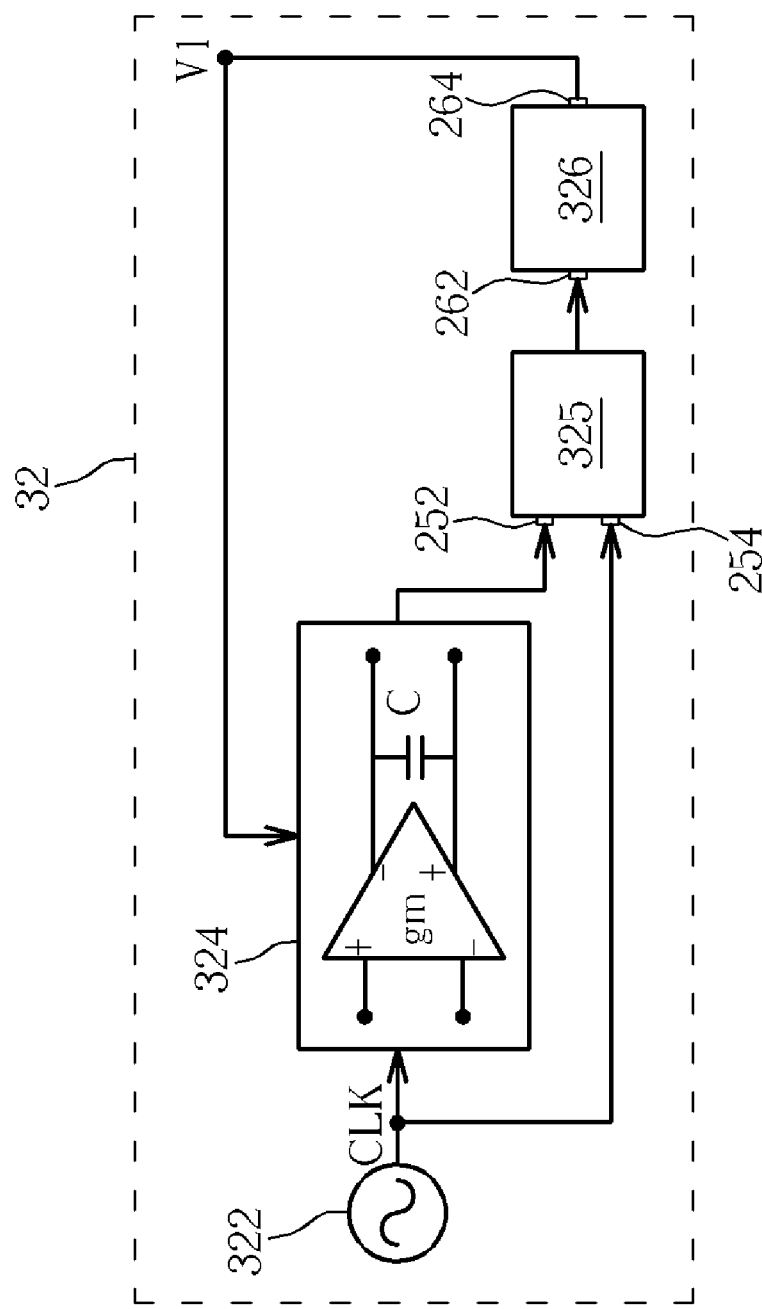
FIG. 4 is a diagram illustrating the auto-calibration loop in FIG. 3.

Please refer to FIG. 4. FIG. 4 is a diagram illustrating the auto-calibration loop 32 in FIG. 3. The auto-calibration loop 32 includes an oscillator 322, an integrator 324, an amplitude comparator 325, and a working voltage adjuster 326. The oscillator 322 is a quartz oscillator for generating a reference clock signal CLK with a frequency fc. In one embodiment, the reference clock signal CLK is a sine-wave signal. The quartz oscillator is suited to be the standard of the amplitude comparator due to the stable frequency characteristics. The integrator 324 is coupled to the oscillator 322 for generating an output amplitude according to a working voltage V1. The integrator 324 includes a unity gain frequency fu that corresponds to the output amplitude. The amplitude comparator 325 includes a first input end 252 coupled to the integrator 324 for receiving the output amplitude and a second input end 254 coupled to the oscillator 322. The amplitude comparator 325 is used for comparing the output amplitude of the integrator 324 with the amplitude of the reference clock signal CLK and outputting a comparison result. The working voltage adjuster 326 has an input end 262 coupled to the amplitude comparator 325, and an output end 264 coupled to the integrator 324 and the band-pass filter 34 (not shown in FIG. 4). The working voltage adjuster 326 is used for tuning the working voltage V1 of the integrator 324 and the band-pass filter 34 according to the comparison result. The integrator 324 includes a transconductor gm and a capacitor C. The transconductor gm is coupled to the oscillator 322 and the working voltage adjuster 326 for generating a driving signal according to the reference clock signal CLK and the working voltage V1. The capacitor C is coupled to the transconductor gm for charging or discharging to generate the output amplitude according to the driving signal outputted from the transconductor gm.

The integrator 324 includes a unity gain frequency fu that is decided by the transconductance gm and the capacitor C with an equation fu=transconductance/(2*pi*C). Therefore, the unity gain frequency fu of the integrator 324 is the same as the center frequency fc of the band-pass filter 34 due to replicating the same capacitor C and the same transconductor gm that the conductance of the transconductor gm is equal to the band-pass filter 34. The integrator 324 and the band-pass filter 34 adjust simultaneously due to the unity gain frequency fu of the integrator 324 corresponding with the center frequency fc of the band-pass filter 34. The gain of the integrator 324 is 1 when working at frequency fu, that is the amplitude of the input voltage Vin equals the amplitude of the output voltage Vout, The gain of the integrator 324 is greater than 1 when working at frequency higher than fu, meaning that the amplitude of the output voltage Vout is larger than the amplitude of the input voltage Vin. The gain of the integrator 324 is less than 1 when working at frequency less than fu, meaning that the amplitude of the output voltage Vout is less than the amplitude of the input voltage Vin. The unity gain frequency fu can be adjusted by this characteristic of the integrator 324. Finally, the unity gain frequency fu of the integrator 324 is adjusted equivalent to the center frequency fc of the band-pass filter 34.

Figure 5:
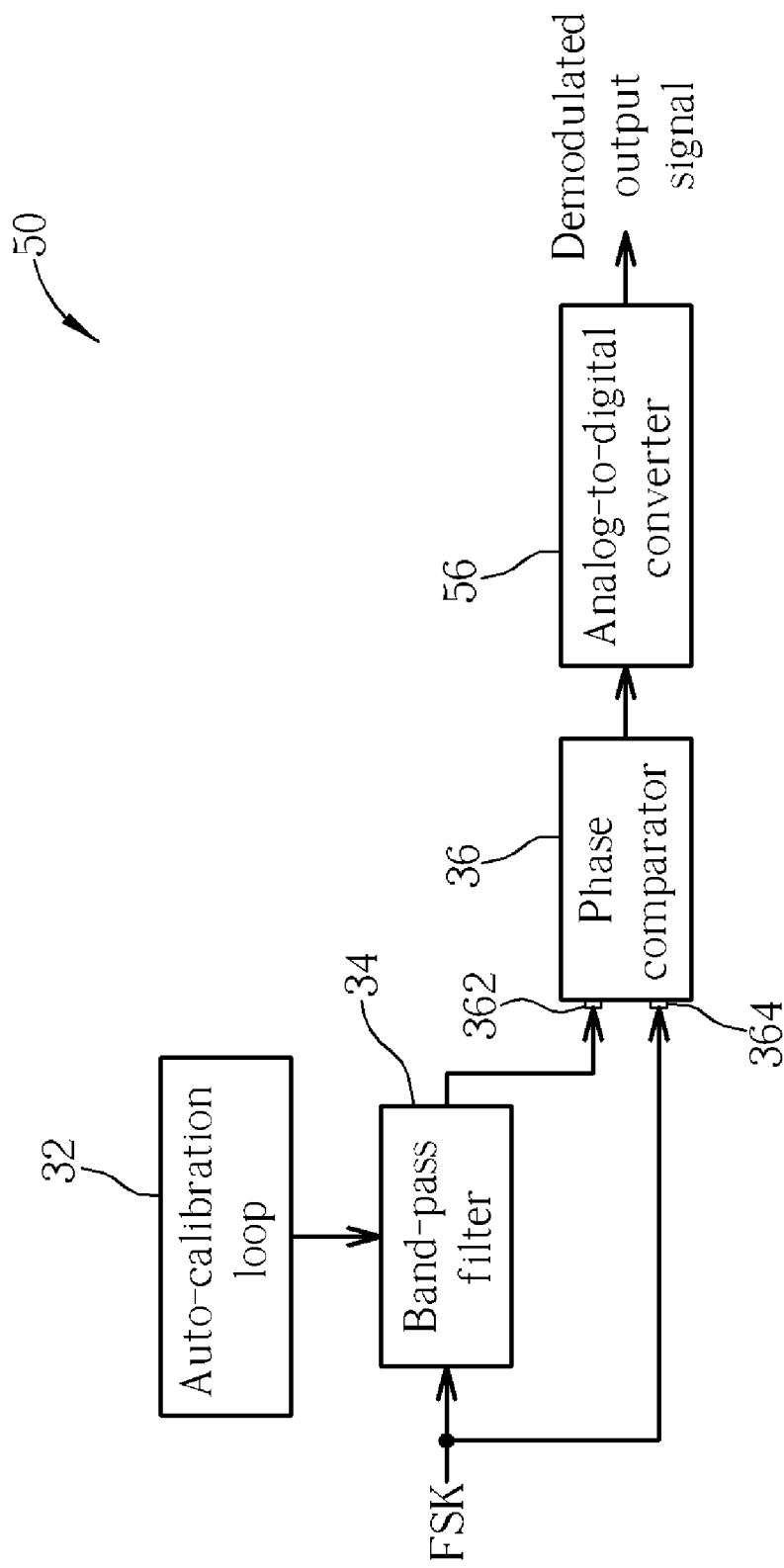
FIG. 5 is a diagram of an FSK demodulator circuit according to an embodiment of the present invention.

Please refer to FIG. 5. FIG. 5 is a diagram of an FSK demodulator circuit 50 according to an embodiment of the present invention. The FSK demodulator circuit 50 includes a band-pass filter 34, an auto-calibration loop 32, a phase comparator 36, and an analog-to-digital converter 56. The analog-to-digital converter 56 is coupled to the phase comparator 36 for converting a result outputted from the phase comparator 36 into digital data. The band-pass filter 34 is used as a phase shifter of the FSK demodulator circuit 50 for shifting phase of a frequency shift keying signal FSK. The band-pass filter 34 includes a center frequency fc. When the frequency of the frequency shift keying signal FSK is exactly fc, a phase difference between the frequency shift keying signal FSK and a signal outputted from the band-pass filter 34 is exactly 0 degrees. When the frequency of the frequency shift keying signal FSK is fc+fsig, the phase difference between the frequency shift keying signal FSK and the signal outputted from the band-pass filter 34 is k*fsig degrees. When the frequency of the frequency shift keying signal FSK is fc−fsig, the phase difference between the frequency shift keying signal FSK and the signal outputted from the band-pass filter 34 is negative k*fsig degrees. The auto-calibration loop 32 is coupled to the band-pass filter 34 for adjusting the center frequency fc of the band-pass filter 34. The first input end 362 of the phase comparator 36 is coupled to an output end of the band-pass filter 34, and the second input end 364 of the phase comparator 36 is used for receiving the frequency shift keying signal FSK. The phase comparator 36 is used for comparing the frequency shift keying signal FSK with the signal outputted from the band-pass filter 34 for a phase difference. Detecting the phase difference between the frequency shift keying signal FSK and the signal outputted from the band-pass filter 34 is greater or less than 0 degrees can derive the value of fsig. This derives the frequency of the frequency shift keying signal FSK (fc+fsig or fc−fsig) further. The derived frequency can be utilized to return the information of the frequency shift keying signal FSK. The band-pass filter 34, the auto-calibration loop 32, the phase comparator 36, and the analog-to-digital converter 56 are integrated on a same chip. The band-pass filter 34 and the auto-calibration loop 32 include the same components. For an example, the band-pass filter 34 is a transconductance-c filter, and the auto-calibration loop 32 is an integrator comprising transconductors and capacitors.

The above-mentioned embodiments illustrate but do not limit the present invention. The band-pass filter 34 and the auto-calibration loop 32 are not restricted to specific components only. The band-pass filter 34 and the auto-calibration loop 32 comprising same components belong to the category of the present invention. Furthermore, other external circuits can be applied depending on user's demand.

In conclusion, the present invention provides an FM demodulator circuit 30 and an FSK demodulator circuit 50 with a build-in band-pass filter. Being without external capacitors and inductors as a phase shifter can lower the cost and save PCB area. The auto-calibration loop 32 to get a higher quality FM demodulating or FSK demodulating can fix the center frequency fc of the band-pass filter 34. Furthermore, the circuit used for detecting whether the phase difference is greater or less than 0 degrees is easier than the circuit used for detecting whether the phase difference is greater or less than 90 degrees.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frequency shift keying (FSK) demodulator with build-in band-pass filter, the FSK demodulator comprising:
    a band-pass filter, which is used as a phase shifter of the FSK demodulator for shifting phase of an FSK signal to generate a revised FSK signal;
    an auto-calibration loop coupled to the band-pass filter for adjusting a center frequency of the band-pass filter, wherein the auto-calibration loop comprises:
        an oscillator for generating a reference clock signal;
        an integrator coupled to the oscillator for generating an output amplitude according to the reference clock signal and a working voltage;
        an amplitude comparator including a first input end coupled to the integrator, and a second input end coupled to the oscillator, the amplitude comparator used for comparing the output amplitude of the integrator with an amplitude of the reference clock signal of the oscillator and outputting a comparison result; and
        a working voltage adjuster having an input end coupled to the amplitude comparator and an output end coupled to the integrator, the working voltage adjuster used for tuning the working voltage of the integrator according to the comparison result outputted from the amplitude comparator;
    a phase comparator including a first input end coupled to an output end of the band-pass filter, and a second input end for receiving the FSK signal, the phase comparator used for comparing the FSK signal with the revised FSK signal for a phase difference and outputting a comparison result; and
    an analog-to-digital converter coupled to the phase comparator for converting the comparison result into digital data.

2. The FSK demodulator of claim 1, wherein the band-pass filter and the auto-calibration loop comprise the same components.

3. The FSK demodulator of claim 1, wherein the band-pass filter is a transconductance-c filter.

4. The fsk demodulator of claim 1, wherein the integrator includes a unity gain frequency that corresponds with the output amplitude.

5. The FSK demodulator of claim 4, wherein the unity gain frequency of the integrator corresponds with the center frequency of the band-pass filter.

6. The FSK demodulator of claim 1, wherein the integrator comprises:
    a transconductor coupled to the oscillator and the working voltage adjuster for generating a driving signal according to the reference clock signal and the working voltage; and a capacitor coupled to the transconductor for charging or discharging to generate the output amplitude according to the driving signal of the transconductor.

7. A frequency modulation (FM) demodulator with build-in band-pass filter, the FM demodulator comprising:
   a band-pass filter used as a phase shifter of the FM demodulator for shifting phase of an FM signal to generate a revised FM signal;
   an auto-calibration loop coupled to the band-pass filter for adjusting a center frequency of the band-pass filter, wherein the auto-calibration loop comprises:
      an oscillator for generating a reference clock signal;
      an integrator coupled to the oscillator for generating an output amplitude according to the reference clock signal and a working voltage;
      an amplitude comparator including a first input end coupled to the integrator and a second input end coupled to the oscillator, the amplitude comparator used for comparing the output amplitude of the integrator with an amplitude of the reference clock signal of the oscillator and outputting a comparison result; and
      a working voltage adjuster including an input end coupled to the amplitude comparator and an output end coupled to the integrator, the working voltage adjuster used for tuning the working voltage of the integrator according to the comparison result outputted from the amplitude comparator; and
   a phase comparator including a first input end coupled to an output end of the band-pass filter and a second input end for receiving the FM signal, the phase comparator used for comparing the FM signal with the revised FM signal for a phase difference and outputting a comparison result.

8. The FM demodulator of claim 7, wherein the band-pass filter and the auto-calibration loop comprise the same components.

9. The FM demodulator of claim 7, wherein the filter is a transconductance-c filter.

10. The FM demodulator of claim 7, wherein the integrator includes a unity gain frequency that corresponds with the output amplitude.

11. The FM demodulator of claim 10, wherein the unity gain frequency of the integrator corresponds with the center frequency of the band-pass filter.

12. The FM demodulator of claim 7, wherein the integrator comprises:
   a transconductor coupled to the oscillator and the working voltage adjuster for generating a driving signal according to the reference clock signal and the working voltage; and
   a capacitor coupled to the transconductor for charging or discharging to generate the output amplitude according to the driving signal of the transconductor.

13. A frequency shift keying (FSK) demodulating method, the method comprising:
   shifting a phase of an FSK signal to generate a revised FSK signal;
   adjusting a center frequency for calibrating the phase shifting of the FSK signal, wherein adjusting the center frequency for calibrating the phase shifting of the FSK signal comprises:
      generating a reference clock signal;
      generating an output amplitude according to the reference clock signal and a working voltage;
      comparing the output amplitude with an amplitude of the reference clock signal and outputting a comparison result; and
      adjusting the working voltage according to the comparison result and adjusting the center frequency according the adjusted working voltage;
   comparing the FSK signal with the revised FSK signal for a phase difference and outputting a comparison result; and
   converting the comparison result into digital data.

14. The FSK demodulating method of claim 13, further comprising:
   generating a driving signal according to the reference clock signal and the working voltage; and
   charging or discharging a capacitor to generate the output amplitude according to the driving signal.

15. A frequency modulation (FM) demodulating method, the method comprising:
   shifting the phase of an FM signal to generate a revised FM signal;
   adjusting a center frequency for calibrating the phase shifting of the FM signal,. wherein adjusting the center frequency for calibrating the phase shifting of the FM signal comprises:
      generating a reference clock signal;
      generating an output amplitude according to the reference clock signal and a working voltage;
      comparing the output amplitude with an amplitude of the reference clock signal and outputting a comparison result; and
      adjusting the working voltage according to the comparison result and adjusting the center frequency according to the adjusted working voltage; and
   comparing the FM signal with the revised FM signal for a phase difference and outputting a comparison result.

16. The FM demodulating method of claim 15, further comprising:
   generating a driving signal according to the reference clock signal and the working voltage; and
   charging or discharging a capacitor to generate the output amplitude according to the driving signal.

* * * * *